(12) United States Patent
May

(10) Patent No.: US 7,663,777 B2
(45) Date of Patent: Feb. 16, 2010

(54) DEFAULT SETTINGS CUSTOMIZATION SYSTEM

(75) Inventor: Timothy A. May, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 814 days.

(21) Appl. No.: 11/123,332

(22) Filed: May 6, 2005

(65) Prior Publication Data

US 2006/0250637 A1  Nov. 9, 2006

(51) Int. Cl.
*G06K 15/00* (2006.01)
*G06F 15/173* (2006.01)

(52) U.S. Cl. ..................... 358/1.18; 709/224

(58) Field of Classification Search ............... 358/1.18, 358/1.15, 1.13, 1.14, 1.16, 1.1, 438, 1.9, 358/527, 434, 497, 504; 709/224, 206, 250, 709/202, 203, 228, 230, 229, 219; 399/8, 399/174, 175, 324; 370/329, 335, 340, 352, 370/353; 705/34, 37; 715/230, 234, 700, 715/705, 839; 400/61
See application file for complete search history.

(56) References Cited

U.S. PATENT DOCUMENTS

| 4,456,238 | A | 6/1984 | Mitzuma |
| 5,004,217 | A | 4/1991 | Kano et al. |
| 5,095,370 | A | 3/1992 | Takada et al. |
| 5,517,332 | A | 5/1996 | Barry et al. |
| 5,662,320 | A | 9/1997 | Fujiwara et al. |
| 5,751,448 | A | 5/1998 | Kim et al. |
| 5,823,522 | A | 10/1998 | Fujiwara et al. |
| 5,897,110 | A | 4/1999 | Fujiwara |
| 5,982,512 | A | 11/1999 | Kim |
| 6,215,970 | B1 | 4/2001 | Yoshikawa et al. |
| 6,507,418 | B1 | 1/2003 | Chen |
| 6,728,012 | B2 | 4/2004 | Bacher et al. |
| 6,864,999 | B1 | 3/2005 | Fujimoto et al. |
| 7,212,306 | B2 * | 5/2007 | Chrisop et al. ............. 358/1.16 |
| 2004/0047010 | A1* | 3/2004 | Suenaga et al. ............. 358/504 |
| 2007/0150534 | A1* | 6/2007 | Hyakutake et al. .......... 709/200 |

* cited by examiner

*Primary Examiner*—Saeid Ebrahimi Dehkordy

(57) ABSTRACT

A method for customizing a print device to a specific user including prompting a user of the device to indicate whether the device is intended for a first type of use or a second, different type of use, receiving an indication of intended use and, in response to the indication, automatically establishing at least one device default setting.

20 Claims, 1 Drawing Sheet

DEFAULT SETTINGS CUSTOMIZATION SYSTEM

CROSS REFERENCES TO RELATED APPLICATIONS

None.

STATEMENT REGARDING FEDERALLY SPONSORED RESEARCH OR DEVELOPMENT

None. REFERENCE TO SEQUENTIAL LISTING, ETC. None.

BACKGROUND

1. Field of the Invention

The present application relates to a system and method for customizing a print device and, more particularly, a system and method for customizing the default settings of a print device for either home or office use.

2. Description of the Related Art

All-in-one printing devices (AIOs) have become commonplace in the world of computer-related hardware. AIOs typically provide printing, copying, scanning and/or fax capabilities in a single device. A typical AIO may integrate two basic components: a document scanner and a print engine. Printing and scanning may each be carried out utilizing just one component of the device, while copying may be performed utilizing both components.

AIOs have been modified and expanded to include additional subsystems and components such as complex photo printing features, various card readers, USB keys and the like. Although such improved subsystems and components offer a wide range of capabilities to the end user, such improved features have complicated the programming and configuration of AIOs.

Historically, AIOs have been marketed to and purchased by individuals solely for home use. However, as the productivity and capability of AIOs continues to increase (e.g., higher printing speeds and improved printing quality), AIOs are also being purchased for use by small-sized and medium-sized businesses.

AIO manufacturers have recognized that business users utilize AIOs in a different way than home users. For example, home users may prefer to forego printing speed for improved print quality. In contrast, business users may be willing to accept reduced print quality for increased printing speed due to the higher volume of printing taking place in the business or office environment.

Thus, AIO manufacturers have provided AIOs with various options. For example, an AIO may have a print quality option that enables a user to indicate a priority for higher printing speed (i.e., "draft mode") or improved print quality (i.e., "quality mode"). A business user may select the draft mode, while the home user may select the quality mode.

Prior art AIOs typically defaulted such options to typical home user preferences. For example, prior art AIOs were packaged with the print quality option defaulted to quality mode.

However, as AIO manufacturers target business users, AIO manufacturers must choose between establishing default settings for the home user and establishing default settings for the business user. The option of selling two different models of the same AIO device (i.e., one with business user default settings and one with home user default settings) is impractical.

Accordingly, there is a need for a system and method for customizing the default settings of a print device for either home or office use.

SUMMARY

In one aspect, the default settings customization system provides a method for customizing a print device to a specific user including prompting a user of the device to indicate whether the device is intended for a first type of use or a second, different type of use, receiving an indication of intended use and, in response to the indication, automatically establishing at least one device default setting.

In another aspect, the default settings customization system provides a method for customizing a print device having at least one option to a user. The method includes providing the print device with at least two potential default settings for the option, wherein at least one of the potential default settings is directed to a home user and at least one of the potential default setting is directed to a business user, prompting the user to identify whether the device is intended for use as a home device or as a business device, receiving an indication of intended use, selecting one of the potential default settings in response to the indication, and establishing the selected potential default setting as a default setting for the option.

In another aspect, the default settings customization system provides a print device including a print engine having at least one option associated therewith and a user interface adapted to prompt a user whether the print device will be used as home device or as a business device, wherein a default setting is established for the option based upon the user's response to the prompt.

Other aspects of the default settings customization system will become apparent from the following description, the accompanying drawings and the appended claims.

DETAILED DESCRIPTION

Figure 1:
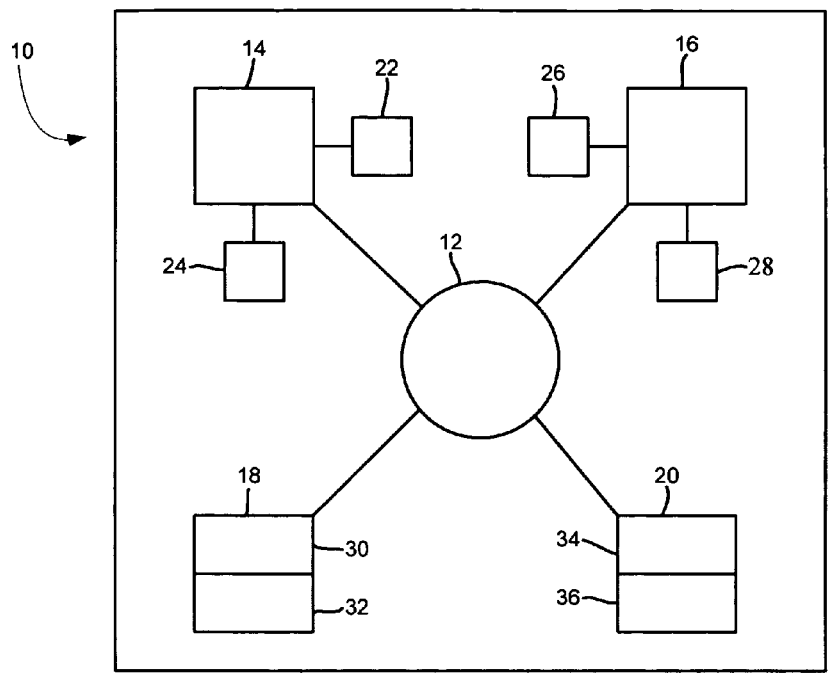
FIG. 1 is a block diagram of a print device according to a first aspect of the default settings customization system.

As shown in FIG. 1, a print device according to a first aspect of the default settings customization system, generally designated 10, may include a processor 12 in communication with a print engine 14, a scanner 16, a user interface 18 and a communication subsystem 20. The processor 12 may coordinate the functions and intercommunications of the print engine 14, the scanner 16, the user interface 18 and the communication subsystem 20 to allow the device 10 to process various jobs (e.g., print, copy and scan jobs).

The print engine 14 may be adapted to receive print data from the processor 12 and convert the print data into a printed image (e.g., ink on paper). Two substrate storage trays 22, 24 may be in communication with the print engine 14 to provide the print engine 14 with a supply of printing substrate (e.g., paper). In one aspect, low quality (e.g., draft) paper may be provided in tray 22 and high quality (e.g., bond or letterhead) paper may be provided in tray 24. In another aspect, both trays 22, 24 may be provided with the same type of paper.

The scanner 16 may be adapted to scan a document or image and generate electronic data based on the scanned document or image. The scanner 16 may include a flat bed scanning window 26 and/or an automatic document feeder 28. The window 26 and feeder 28 may provide an interface for a user to present the document or image to be scanned.

The user interface 18 may be a graphical user interface or the like and may include a display 30 and/or a control panel 32. The display 30 may be a monitor, an LCD display, a touch screen or the like and may be capable of displaying various text and/or images for viewing by a user. The control panel 32 may be a series of buttons, a keyboard, a mouse or the like and may allow a user to select and manipulate various programs, options, settings and operations. In the alternative, the display 30 may be a personal computer connected to the device 10 by a USB network or wireless connection.

The communication subsystem 20 may allow the device 10 to communicate with external devices such as computers, other print devices, networks, fax machines and the like. The communication subsystem 20 may include a fax modem 34 and/or a network connection 36. In one aspect, the communication subsystem 20 may wirelessly communicate with other devices. In another aspect, the communication subsystem 20 may communicate with other devices via a hard-wired connection (e.g., a wire, cord or cable).

It should be understood that device 10 according to the default settings customization system may be or function as an AIO device, a multi-function peripheral (MFP), a standard ink-jet printer or the like. Furthermore, it should be understood that the device 10 according to the default settings customization system may include some or all of the components and subsystems discussed above (i.e., the print engine 14, the scanner 16, the user interface 18 and the communication subsystem 20) and may also include additional components and subsystems not discussed above, such as, but not limited to, photo printing features, various card readers, USB keys/ports and sound features.

Each component and subsystem of the device 10 may be adapted to work in concert with the other components and subsystems via, for example, the processor 12. For example, when a user requests a copy job, a document may be inserted into the automatic document feeder 28 where it is feed to the scanner 16 and scanned. The processor 12 may then send the scan data to the print engine where the scan data is converted into a printed image, thereby creating a copy of the original document.

Each component or subsystem may include one or more associated options. The options may relate to the performance and/or configuration of various aspects of the device 10. In one aspect, the print engine 14 may include a tray linking option and a smart copy (or print quality) option, the processor 12 may include a power save option and the communication subsystem 20 may include a junk fax blocking option. It should be understood that various other options are within the scope of the default settings customization system.

The tray linking option provides a link between the two or more substrate storage trays 22, 24 such that the trays 22, 24 effectively operate as a single tray. Tray linking allows the user to store the same type of paper in each tray 22, 24 and, when one tray (e.g., tray 22) is empty, the print engine 14 automatically begins to pull paper from the second tray (e.g., tray 24). The tray linking option may be defaulted to "on" or "off." A business user may prefer the tray linking option defaulted to "on," while the home user may prefer the tray linking option defaulted to "off."

The smart copy option takes advantage of the trade-off between printing speed and print quality. A typical print engine 14 may have increased printing speed with a corresponding reduction in print quality. Likewise, the typical print engine 14 may have improved print quality at the expense of printing speed. The smart copy option allows a user to forego printing speed for print quality. Thus, a business user may prefer the smart copy option defaulted to "off" to accommodate higher printing volume, while the home user may prefer the smart copy option defaulted to "on" to obtain higher quality printed images and documents.

The power save option, when active, may automatically power-down the device 10 after a predetermined amount of time has elapsed. The predetermined amount of time may be preprogrammed onto the device or may be set by the user. The power save option may include various default settings. For example, the power save option may be defaulted to "off," "power down after 20 minutes non-use" or "power down after 1 hour non-use." A business user may prefer the power save option defaulted to "off" or a power down after an extended period of time, while the home user may prefer the power save option defaulted to a power down after a shorter amount of time.

The junk fax blocking option may be used to filter the faxes being received by the device. In one aspect, the junk fax blocking option filters out faxes sent from unknown senders using a caller-id-based sender recognition system. An unknown sender may be a sender that is not listed in a pool of acceptable senders. Alternatively, an unknown sender may be a sender listed in a "do not receive" list. Still alternatively, an unknown sender may be a sender that cannot be identified by the caller-id-based sender recognition system. Thus, the junk fax blocking option may be defaulted to "off" for business use due to the higher volume of faxes received in the business environment, while the junk fax blocking option may be defaulted to "on" for home use.

Figure 2:
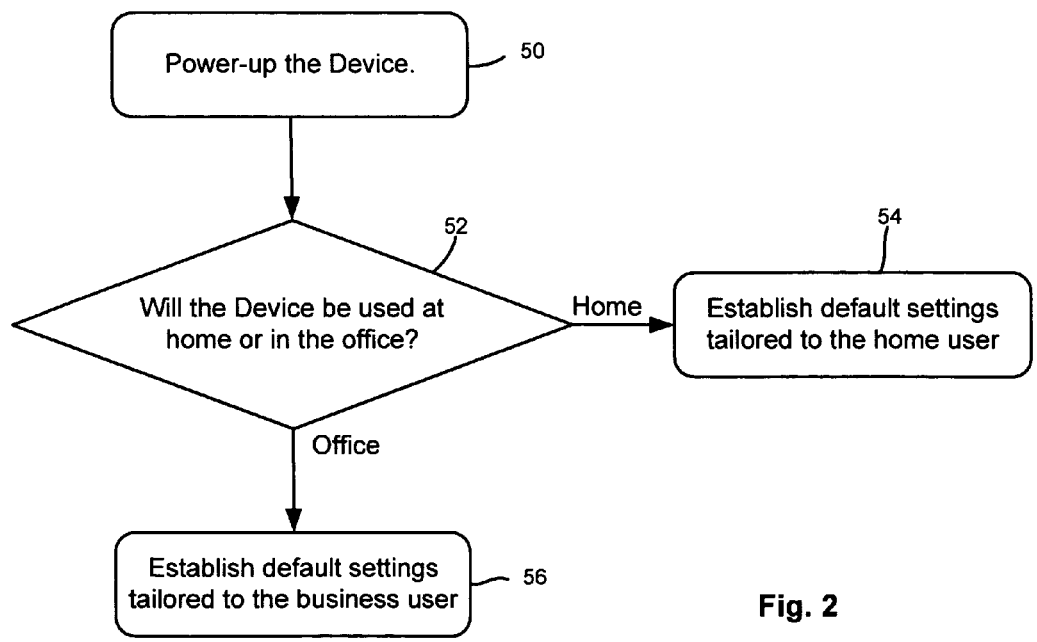
FIG. 2 is a flow diagram according to a second aspect of the default settings customization system.

According to the default settings customization system, the default settings of at least one option of the device 10 may be tailored to a specific end user (i.e., a home user or an office user) during the initial or, alternatively, each power-up (or boot-up) of the device 10, as shown by box 50 of the flowchart of FIG. 2. According to one aspect, the user may be prompted with a single question via the user interface 18 during the initial power-up of the device 10, as shown in box 52. For example, the device 10 may ask "Will this device be used in a home for personal use or as a business machine." Based on the user's response to the question (via the user interface 18), the device 10 may establish a default setting for at least one option, wherein the default setting is tailored to either home or business use, as shown in boxes 54, 56, respectively. If the user indicates that the device 10 will be used at home, the device 10 may establish default settings tailored to the home user (e.g., tray linking "off," smart copy "on," power save "on" and junk fax blocking "on"). If the user indicates that the device 10 will be used as a business machine, the device 10 may establish default settings tailored to the business user (e.g., tray linking "on," smart copy "off," power save "off" and junk fax blocking "off").

In one aspect, the default settings may be customized, as shown in FIG. 2, only during the initial (i.e., first) power-up of the device 10. All subsequent power-ups may skip the customizing steps (see boxes 52, 54 and 56 of FIG. 2) and apply the default setting (i.e., either home user or business user preferences) established during the initial power-up. In another aspect, the device 10 may run through the customizing steps (see boxes 52, 54 and 56 of FIG. 2) during each power-up of the device 10.

Although the default settings customization system has been shown and described with respect to certain aspects, it is obvious that modifications will occur to those skilled in the art upon reading the specification. The default settings customization system includes all such modifications and is limited only by the scope of the claims.

What is claimed is:

1. A method for customizing a print device to a specific user comprising:
    prompting a user of said device to choose a type of intended use of the device, the type of use being a first use or a second use, the first use being different from the second use, and the types of intended use being displayed on the device for selection by the user;
    receiving an indication of intended use; and
    in response to said indication, automatically establishing at least one default setting.

2. The method of claim 1 wherein said device default setting is a default setting of at least one option.

3. The method of claim 2 wherein said option is selected from the group consisting of tray linking, smart copy, power save and junk fax blocking.

4. The method of claim 1 wherein said device is an all-in-one print device.

5. The method of claim 4 wherein said all-in-one print device includes a print engine, a scanner, a user interface and a communication subsystem.

6. The method of claim 1 wherein said device includes a print engine component and a scanner component.

7. The method of claim 1 wherein said establishing step includes tailoring said device default setting to home use when said device receives a user indication that said device is intended for said first use.

8. The method of claim 1 wherein said establishing step includes tailoring said device default setting to business use when said device receives a user indication that said device is intended for said second use.

9. The method of claim 1 wherein said prompting step occurs after said print device is powered-up and before said print device processes a job.

10. The method of claim 1 wherein said prompting step includes the step of displaying a question on a user interface associated with said device.

11. The method of claim 1 further comprising repeating said prompting and said establishing steps each time said device is powered-up or booted-up.

12. The method of claim 1 further comprising providing device with at least two potential default settings for an associated option, wherein at least one of said potential default settings is adapted for a home user and at least one of said potential default setting is adapted for a business user.

13. The method of claim 12 wherein said establishing step includes selecting one of said at least two potential default settings based upon said end user's response to said prompting step.

14. A method for customizing a print device having at least one option to a user comprising:
    providing said device with at least two potential default settings for said option, wherein at least one of said potential default settings is directed to a home user and at least one of said potential default setting is directed to a business user;
    prompting a user of said device to choose a type of intended use of the device, the type of use being a first use or a second use, the first use being different from the second use, the first use being directed to a home use, and the second use being directed to a business use and the types of intended use being displayed on the device for selection by the user;
    receiving an indication of intended use;
    selecting one of said potential default settings in response to said indication; and
    establishing said selected one of said potential default settings as a default setting for said option.

15. The method of claim 14 wherein said option is selected from the group consisting of tray linking, smart copy, power save and junk fax blocking.

16. The method of claim 14 wherein said device is an all-in-one print device.

17. The method of claim 16 wherein said all-in-one print device includes a print engine, a scanner, a user interface and a communication subsystem.

18. The method of claim 14 wherein said prompting step occurs after said print device is powered-up and before said print device processes a job.

19. The method of claim 14 wherein said prompting step includes the step of displaying a question on a user interface associated with said device.

20. A print device comprising:
    a print engine having at least one option associated therewith; and
    a user interface adapted to prompt a user to choose a type of intended use of the device, the type of use being a first use or a second use, the first use being different from the second use, the first use being directed to home use and the second use being directed to business use, and the types of intended use being displayed on the device for selection by the user wherein a default setting is established for said option based upon a user's response to said prompt.

* * * * *

UNITED STATES PATENT AND TRADEMARK OFFICE
CERTIFICATE OF CORRECTION

PATENT NO. : 7,663,777 B2  Page 1 of 1
APPLICATION NO. : 11/123332
DATED : February 16, 2010
INVENTOR(S) : Timothy A. May It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1290 days.

Signed and Sealed this

Twenty-eighth Day of December, 2010

David J. Kappos
*Director of the United States Patent and Trademark Office*